(12) United States Patent
Velayudham et al.

(10) Patent No.: US 11,861,084 B2
(45) Date of Patent: Jan. 2, 2024

(54) SPLITTING A MOBILE DEVICE DISPLAY AND MAPPING CONTENT WITH SINGLE HAND

(71) Applicant: INTERNATIONAL BUSINESS MACHINES CORPORATION, Armonk, NY (US)

(72) Inventors: Asha Velayudham, Visakhapatnam (IN); Chaitanya Korupolu, Visakhapatnam (IN); Sudeep Brajabasi, Visakhapatnam (IN); Sarbajit K. Rakshit, Kolkata (IN); Venkata Vara Prasad Karri, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 110 days.

(21) Appl. No.: 17/455,557

(22) Filed: Nov. 18, 2021

(65) Prior Publication Data

US 2023/0152912 A1 May 18, 2023

(51) Int. Cl.
*G06F 3/041* (2006.01)
(52) U.S. Cl.
CPC .................. *G06F 3/041* (2013.01)
(58) Field of Classification Search
CPC ........................................ G06F 3/041
See application file for complete search history.

(56) References Cited

U.S. PATENT DOCUMENTS 8,769,431 B1 * 7/2014 Prasad .................. G06F 3/0488
715/764
9,203,951 B1 * 12/2015 Kritt ................. H04M 1/72469
(Continued)

FOREIGN PATENT DOCUMENTS

| CN | 103226453 B | 6/2015 |
| CN | 105323360 A | 2/2016 |

(Continued)

OTHER PUBLICATIONS

Disclosed Anonymously, A method of achieving single-hand operation on mobile phones, IPCOM000244661D, Jan. 6, 2016, 3 Pages. https://priorart.ip.com/IPCOM/000244661.
(Continued)

*Primary Examiner* — Temesghen Ghebretinsae
*Assistant Examiner* — Sosina Abebe
(74) *Attorney, Agent, or Firm* — Robert R. Aragona

(57) ABSTRACT

An embodiment for splitting a mobile device display is provided. The embodiment may include receiving configuration criteria regarding mobile device display splitting and content mapping from a user. The embodiment may also include identifying a first location of a first finger and a second location of a second finger of the user on a frame of a mobile device. The embodiment may further include in response to determining the user is moving the first finger in a first direction, creating a plurality of split displays on the mobile device. The embodiment may also include identifying a contextual situation of the user. The embodiment may further include displaying a plurality of content adjacent to the second finger of the user. The embodiment may also include mapping one or more items of the plurality of content to one or more of the plurality of split displays.

20 Claims, 6 Drawing Sheets

(56) References Cited

U.S. PATENT DOCUMENTS

| | | | |
|---|---|---|---|
| 10,082,936 B1* | 9/2018 | Dillon | G06F 3/0488 |
| 10,963,139 B2 | 3/2021 | Kang | |
| 2010/0079395 A1* | 4/2010 | Kim | G09G 5/00 |
| | | | 345/173 |
| 2010/0085317 A1* | 4/2010 | Park | G06F 3/04817 |
| | | | 715/810 |
| 2010/0134423 A1* | 6/2010 | Brisebois | G06F 3/038 |
| | | | 345/173 |
| 2010/0248788 A1 | 9/2010 | Yook | |
| 2012/0218206 A1* | 8/2012 | Sato | G06F 3/041 |
| | | | 345/173 |
| 2013/0201155 A1* | 8/2013 | Wu | G06F 3/03547 |
| | | | 345/173 |
| 2014/0181750 A1* | 6/2014 | Fujiwara | G06F 3/0488 |
| | | | 715/835 |
| 2014/0189608 A1* | 7/2014 | Shuttleworth | H04M 1/67 |
| | | | 715/863 |
| 2014/0289642 A1* | 9/2014 | Prasad | G06F 3/0482 |
| | | | 715/745 |
| 2014/0340338 A1* | 11/2014 | Kim | G06F 3/041 |
| | | | 345/173 |
| 2015/0091854 A1* | 4/2015 | Roziere | G06F 3/0416 |
| | | | 345/174 |
| 2015/0192989 A1* | 7/2015 | Kim | G06F 3/017 |
| | | | 345/156 |
| 2015/0346899 A1* | 12/2015 | Jung | G06F 3/017 |
| | | | 345/173 |
| 2016/0246437 A1* | 8/2016 | Hattori | G06F 3/0483 |
| 2016/0378334 A1* | 12/2016 | Liu | G06F 3/04886 |
| | | | 715/794 |
| 2017/0024124 A1* | 1/2017 | Ueno | G06F 3/041 |
| 2017/0322658 A1* | 11/2017 | Lee | G06F 1/1626 |
| 2017/0336970 A1* | 11/2017 | Kim | G06F 3/04883 |
| 2018/0039340 A1* | 2/2018 | Li | G06F 3/167 |
| 2019/0020760 A1* | 1/2019 | DeBates | H04M 3/493 |
| 2019/0052744 A1* | 2/2019 | Jung | G06F 3/04817 |
| 2020/0218430 A1 | 7/2020 | Yook | |
| 2021/0397264 A1* | 12/2021 | Jain | G06F 1/1626 |
| 2022/0038572 A1* | 2/2022 | Agrawal | H04M 1/0266 |

FOREIGN PATENT DOCUMENTS

| | | |
|---|---|---|
| CN | 104571912 B | 7/2018 |
| WO | 2014165976 A1 | 10/2014 |

OTHER PUBLICATIONS

Hoober, "How Do Users Really Hold Mobile Devices?", Mobile Matters. Feb. 18, 2013, 14 Pages. https://www.uxmatters.com/mt/archives/2013/02/how-do-users-really-hold-mobile-devices.php.

Karlson, et al . . . "Studies in One-Handed Mobile Design: Habit, Desire and Agility", Jan. 2006, 11 Pages. https://www.researchgate.net/publication/228921427_Studies_in_One-Handed_Mobile_Design_Habit_Desire_and_Agility.

Karlson. "Understanding Single-Handed Mobile Device Interaction", Jan. 2008, 9 Pages. https://www.researchgate.net/publication/285703832_Understanding_One-Handed_Use_of_Mobile_Devices.

Lang, "Novel Concepts for Gaze-based Interaction on Mobile Devices", Ludwig-Maximilians-Universitat Munchen, Jan. 4, 2019, 50 Pages.

Le, et al., "Fingers' Range and Comfortable Area for One-Handed Smartphone Interaction Beyond the Touchscreen", University of Stuttgart, Stuttgart, Germany, 2018, 12 Pages.

Mell et al., "The NIST Definition of Cloud Computing", Recommendations of the National Institute of Standards and Technology, NIST Special Publication 800-145, Sep. 2011, 7 pages.

Kataria, "How to Design Mobile Apps for One-Hand Usage", Feb. 20, 2020, 36 Pages. https://www.smashingmagazine.com/2020/02/design-mobile-apps-one-hand-usage/.

Girouard, et al., "One-Handed Bend Interactions with Deformable Smartphones", Apr. 18-23, 2015, 10 Pages.

Goel, et al., "GripSense: Using Built-In Sensors to Detect Hand Posture and Pressure on Commodity Mobile Phones", Oct. 7-10, 2012, 10 Pages.

* cited by examiner

SPLITTING A MOBILE DEVICE DISPLAY AND MAPPING CONTENT WITH SINGLE HAND

BACKGROUND

The present invention relates generally to the field of computing, and more particularly to a system for splitting a mobile device display and mapping content with a single hand of a user.

In the late 20$^{th}$ century and during the beginning of the 21$^{st}$ century, mobile devices, especially cell phones, had small display surfaces (i.e., screens). These mobile devices had a physical keypad which took up a majority of the front portion of the mobile device. More recently, manufacturers have produced smart devices (e.g., smartphones and tablets) with larger display surfaces. These smart devices, particularly smartphones, have most if not all of their functionality on the display surface. For example, the physical keyboard has been replaced with a virtual keyboard. Since the display surfaces of current mobile devices are larger, these display surfaces may be split into different portions, with each portion displaying a variety of content.

SUMMARY

According to one embodiment, a method, computer system, and computer program product for splitting a mobile device display is provided. The embodiment may include receiving configuration criteria regarding mobile device display splitting and content mapping from a user. The embodiment may also include identifying a first location of a first finger and a second location of a second finger of the user on a frame of a mobile device. The first finger may be used in the mobile device display splitting and the second finger may be used in the content mapping in accordance with the configuration criteria. The embodiment may further include in response to determining the user is moving the first finger in the first direction from the first location, creating a plurality of split displays on the mobile device based on the movement of the first finger in the first direction. The embodiment may also include identifying a contextual situation of the user. The embodiment may further include displaying a plurality of content adjacent to the second finger of the user based on the contextual situation. The embodiment may also include mapping one or more items of the plurality of content to one or more of the plurality of split displays based on movement of the second finger along the frame of the mobile device from the second location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
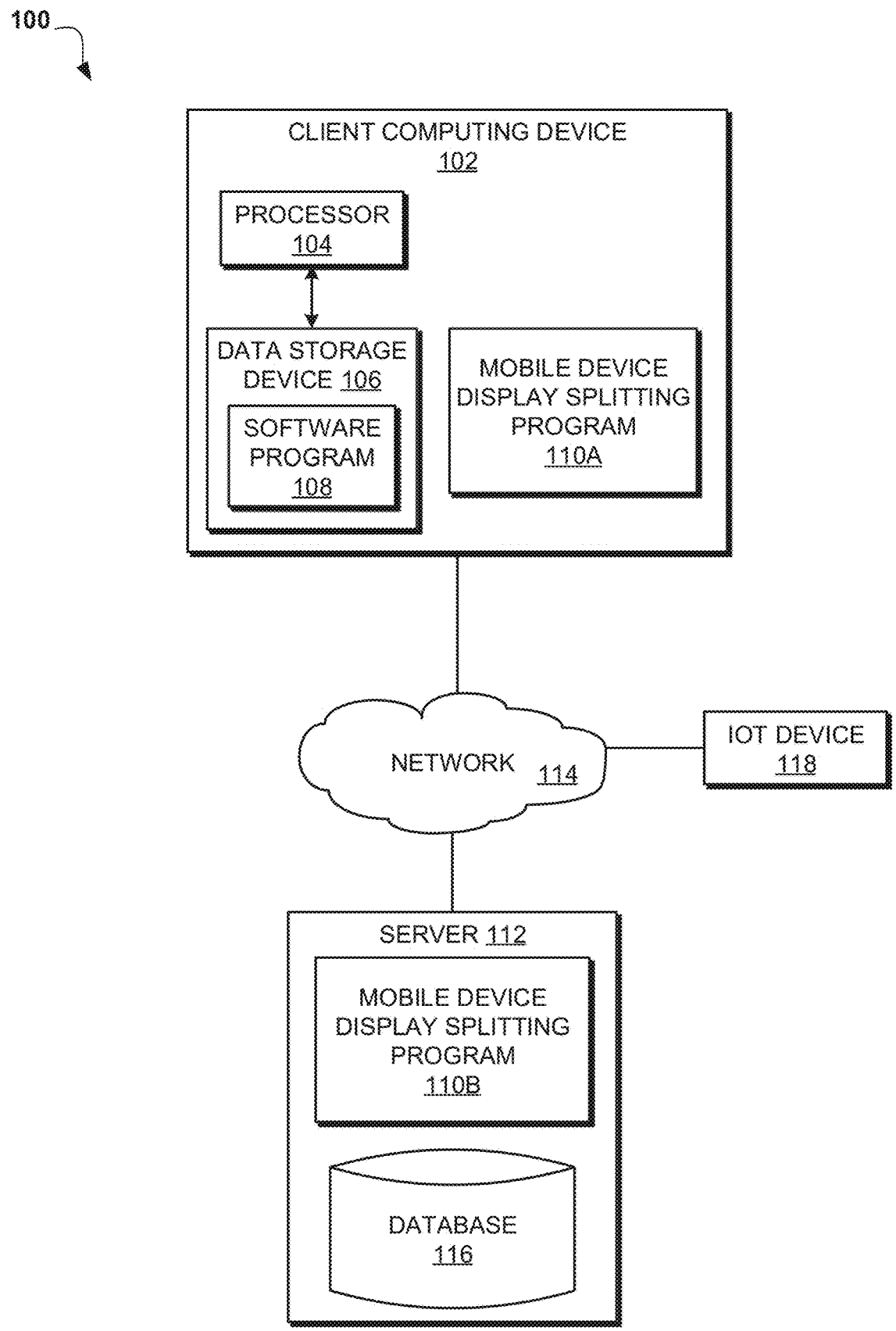
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for splitting a mobile device display and mapping content with a single hand of a user. The following described exemplary embodiments provide a system, method, and program product to, among other things, create a plurality of split displays on a mobile device based on movement of a first finger of the user and, accordingly, map one or more items of a plurality of content to one or more of the plurality of split displays based on movement of a second finger of the user. Therefore, the present embodiment has the capacity to improve the technical field of mobile devices by dynamically splitting a mobile device display and mapping content using a single hand of the user. In addition, the present embodiment has the capacity to improve the graphical user interface (GUI) of a mobile device by displaying the plurality of content to be mapped adjacent to the second finger of the user.

As previously described, in the late 20$^{th}$ century and during the beginning of the 21$^{st}$ century, mobile devices, especially cell phones, had small display surfaces (i.e., screens). These mobile devices had a physical keypad which took up a majority of the front portion of the mobile device. More recently, manufacturers have produced smart devices (e.g., smartphones and tablets) with larger display surfaces. These smart devices, particularly smartphones, have most if not all of their functionality on the display surface. For example, the physical keyboard has been replaced with a virtual keyboard. Since the display surfaces of current mobile devices are larger, these display surfaces may be split into different portions, with each portion displaying a variety of content. It is often difficult to split the display surface and map content to the split sections with one free hand when the other hand is engaged (e.g., carrying a briefcase). Many mobile device manufacturers have an option where the user can long press (i.e., tap and hold) an application and then tap on another option in a pop-up window to show the application is split-screen view. However, this long press option fails to consider that the user may only have one free hand and may not be able to tap on an application oriented in the center of the mobile device display. It may therefore be imperative to have a system in place to enable the user to split the mobile device display into multiple sections and map content to those sections with a single hand. Thus, embodiments of the present invention may provide advantages including, but not limited to, enabling the user to split the mobile device display into multiple sections and map content to those sections with a single hand, presenting content to the user based on a contextual situation of the user, and historically learning a correlation among content the user maps to the split displays. The present invention does not require that all advantages need to be incorporated into every embodiment of the invention.

According to at least one embodiment, when a user is holding a mobile device with one hand while the other hand is engaged, configuration criteria regarding mobile device display splitting and content mapping be received from the user, and a first location of a first finger and a second location of a second finger of the user on a frame of the mobile device is identified. In embodiments of the present invention, the first finger may be used in the mobile device display splitting and the second finger may be used in the content mapping in accordance with the configuration criteria. In response to determining the user is moving the first finger in a first direction along the frame of the mobile device from the first location, a plurality of split displays on the mobile device may be created based on the movement of the first finger in the first direction. Upon creating the plurality of split displays, a contextual situation of the user may be identified in order to display a plurality of content adjacent to the second finger of the user based on the contextual situation. The plurality of content may be displayed adjacent to the second finger of the user such that the user is able to map one or more items of the plurality of content to one or more of the plurality of split displays by moving the second finger along the frame of the mobile device from the second location. According to at least one embodiment, a knowledge corpus of a correlation among the one or more mapped items of the plurality of content may be created based on historical learning.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a plurality of split displays on a mobile device based on movement of a first finger of the user and, accordingly, map one or more items of a plurality of content to one or more of the plurality of split displays based on movement of a second finger of the user.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a mobile device display splitting program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a mobile device display splitting program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a plurality of sensors embedded in the client computing device 102, including pressure sensors and motion sensors, and/or any other IoT Device 118 known in the art for capturing facial and/or hand gestures of a user that is capable of connecting to the communication network 114, and transmitting and receiving data with the client computing device 102 and the server 112.

According to the present embodiment, the mobile device display splitting program 110A, 110B may be a program capable of receiving configuration criteria regarding mobile device display splitting and content mapping from a user, creating a plurality of split displays on a mobile device based on movement of a first finger of the user, mapping one or more items of a plurality of content to one or more of the plurality of split displays based on movement of a second finger of the user, enabling the user to split the mobile device display into multiple sections and map content to those sections with a single hand, presenting content to the user based on a contextual situation of the user, and historically learning a correlation among content the user maps to the split displays. The mobile device display splitting method is explained in further detail below with respect to FIG. 2.

Figure 2:
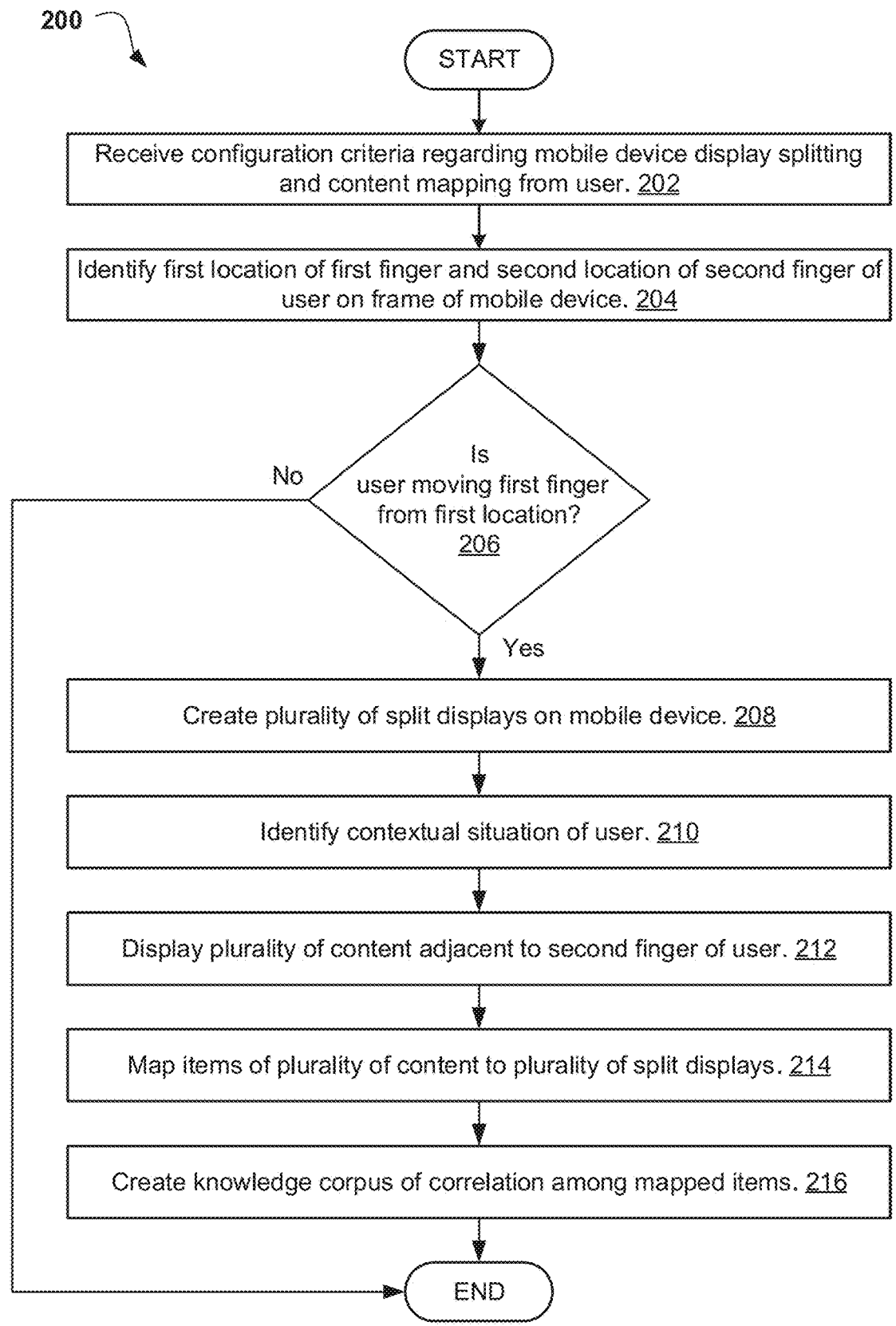
FIG. 2 illustrates an operational flowchart for splitting a mobile device display and mapping content with a single hand of a user in a mobile device display splitting and mapping process according to at least one embodiment.

Referring now to FIG. 2, an operational flowchart for splitting a mobile device display and mapping content with a single hand of a user in a mobile device display splitting and mapping process 200 is depicted according to at least one embodiment. At 202, the mobile device display splitting program 110A, 110B receives the configuration criteria regarding mobile device display splitting and content mapping from the user. The configuration criteria may be provided by the user via a user interface (UI), allowing the user to customize various parameters. It may be appreciated that in embodiments of the present invention, "screen" and "display" are used interchangeably.

According to at least one embodiment, the configuration criteria may include which finger is to be used in the mobile device display splitting and which finger is to be used in the content mapping. In embodiments of the present invention, references are made to a first finger and a second finger of the user. The first finger may be used in the mobile device display splitting, and the second finger may be used in the content mapping. The user may define which finger is the first finger and which finger is the second finger. The first finger may be an index finger, and the second finger may be a thumb. Alternatively, the first finger may be the thumb, and the second finger may be the index finger. In the description that follows, it may be appreciated that for illustrative purposes and brevity the first finger is the index finger, and the second finger is the thumb.

According to at least one other embodiment, the configuration criteria may include an action to be performed by the mobile device display splitting program 110A, 110B based on a direction of movement of the first finger along the frame of the mobile device. In embodiments of the present invention, references are made to a first direction and a second direction. Movement of the first finger in the first direction along the frame of the mobile device may be associated with the creation of the plurality of split displays, and movement of the first finger in the second direction may be associated with a removal of one or more of the plurality of split displays. The user may define the first direction and the second direction. The first direction may be a downward direction (e.g., from a top of the mobile device to a bottom of the mobile device) along the frame of the mobile device, and the second direction may be an upward direction (e.g., from the bottom of the mobile device to the top of the mobile device) along the frame of the mobile device. Alternatively, the first direction may be the upward direction along the frame of the mobile device, and the second direction may be the downward direction along the frame of the mobile device. In the description that follows, it may be appreciated that for illustrative purposes and brevity the first direction is the downward direction along the frame of the mobile device, and the second direction is the upward direction along the frame of the mobile device.

According to at least one further embodiment, the configuration criteria may include whether the user would like a number of split displays to be created to be displayed on the mobile device. In this embodiment, the user may specify that as the user moves the first finger in the downward direction, the number of split displays to be created on the mobile device be displayed in real-time. Alternatively, the user may elect not to display the number of split displays to be created.

According to at least one other further embodiment, the configuration criteria may include the user specifying a movement distance required of the first finger in the first direction to create the plurality of split displays, and a movement distance required of the first finger in the second direction to remove one or more of the plurality of split displays. For example, the user may specify the first finger should move at one inch intervals in the first direction to create the plurality of split displays. In another example, the user may specify the first finger should move at half inch intervals in the first direction to create the plurality of split displays. It may be appreciated that the examples described above are not intended to be limiting, and that in embodiments of the present invention the distance intervals may be configured differently be the user.

Then, at 204, the mobile device display splitting program 110A, 110B identifies the first location of the first finger and the second location of the second finger of the user on the frame of the mobile device. Once the configuration criteria are received from the user, the mobile device display splitting program 110A, 110B may identify the first location and the second location using the plurality of sensors described above with respect to FIG. 1.

As described above, the IoT Device 118 may be a plurality of sensors embedded in the client computing device 102 (e.g., the mobile device), including pressure sensors and motion sensors, and/or any other IoT Device 118 known in the art for capturing facial and/or hand gestures of the user. In embodiments of the present invention, references are made to the first location of the first finger and the second location of the second finger of the user. The first location may be a particular location of the first finger on the frame of the mobile device on one side of the mobile device, and the second location may be a particular location of the second finger on the frame of the mobile device on an opposite side of the mobile device. For example, if the user is right-handed, the first finger (e.g., the index finger) may be contacting the frame of the mobile device on the left side of the mobile device, and the second finger (e.g., the thumb) may be contacting the frame of the mobile device on the right side of the mobile device. Continuing the example, if the user is left-handed, the first finger may be contacting the frame of the mobile device on the right side of the mobile device, and the second finger may be contacting the frame of the mobile device on the left side of the mobile device.

According to at least one embodiment, the user may specify, in the configuration criteria described above with respect to step 204, whether the user is left-handed or right-handed. This information may be stored in a user profile for future use. According to at least one other embodiment, where the user does not specify whether the user is left-handed or right-handed, the plurality of sensors embedded in the mobile device may be used by the mobile device display splitting program 110A, 110B to infer whether the user is left-handed or right-handed. For example, based on a gripping pattern of the user and where pressure is applied on the frame of the mobile device, the plurality of sensors may be able to determine that the user is holding the mobile device with the left-hand, and thus the first finger is on the right side of the mobile device, and the second finger is on the left side of the mobile device. Additional details on the first location and the second location are described in further detail below with respect to steps 206 and 214.

Next, at 206, the mobile device display splitting program 110A, 110B determines whether the user is moving the first finger in the first direction along the frame of the mobile device from the first location. As described above with respect to step 204, the user may be gripping the mobile device in such a manner where the first finger is contacting the frame on the right side of the mobile device, or where the first finger is contacting the frame on the left side of the mobile device.

Figure 3:
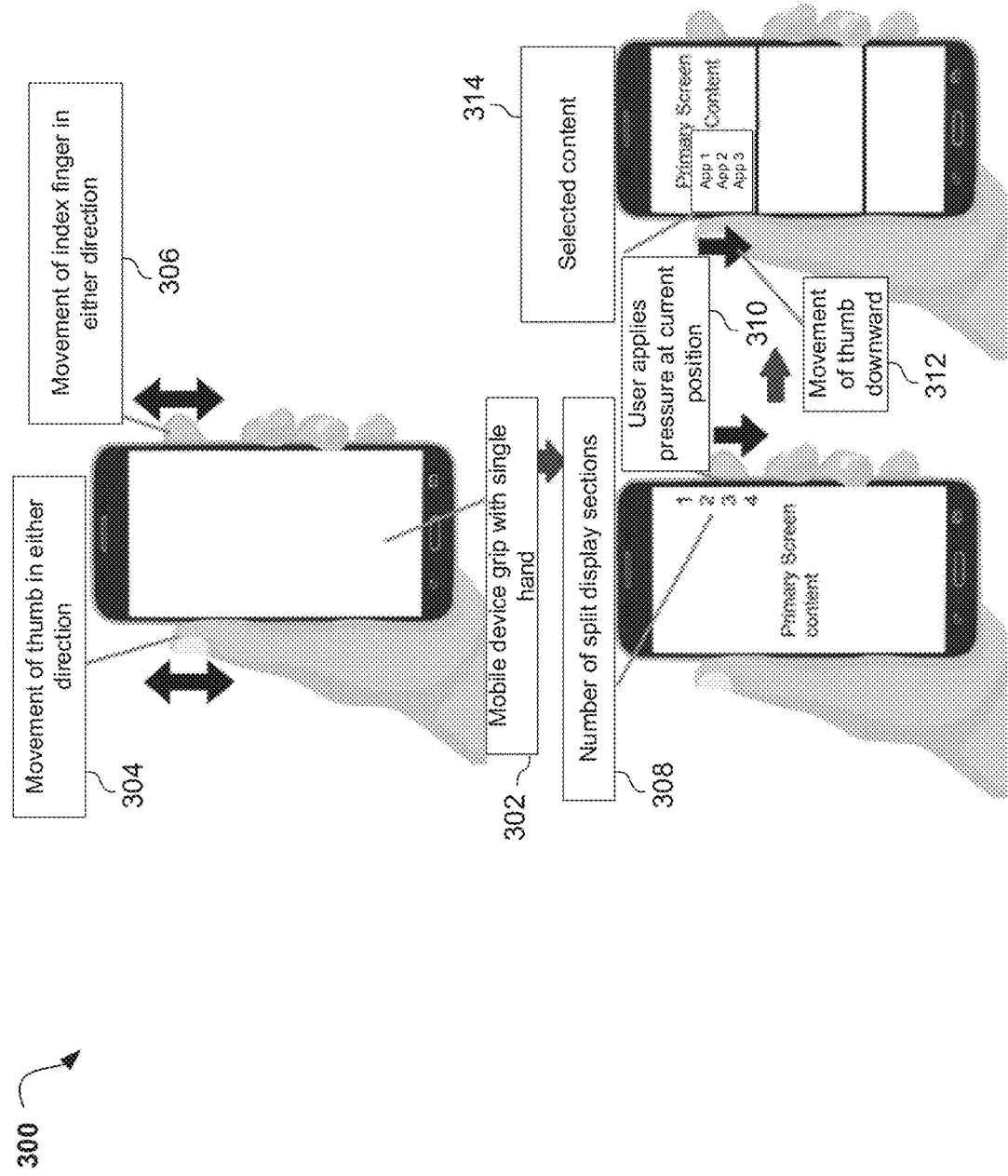
FIG. 3 is a diagram depicting a user creating split display screens and mapping content to the split display screens according to at least one embodiment.

According to at least one embodiment, when the user wishes to view content in a split-screen view, the user may move the first finger in the first direction along the frame of the mobile device from the first location. Additionally, as described above with respect to step 202, as the user moves the first finger along the frame, the number of split displays to be created may be displayed to the user in real-time, which is illustrated in FIG. 3. The plurality of sensors may be utilized by the mobile device display splitting program 110A, 110B to detect a change in pressure along the frame of the mobile device. This change in pressure may be used to infer the user is moving the first finger along the frame of the mobile device. For example, when the user is holding the mobile device in an initial gripping pattern, there would be a degree of pressure applied at the first location. As the user moves the first finger, the pressure of the first finger would be applied at a position other than the first location.

According to at least one other embodiment, when the user does not wish to view content in the split-screen view, the user may simply refrain from moving the first finger from the first location. In this manner, the pressure applied at the first location is constant, which may be used to infer that the user is not moving the first finger along the frame of the mobile device.

In response to determining the user is moving the first finger in the first direction (step 206, "Yes" branch), the mobile device display splitting and mapping process 200 proceeds to step 208 to create the plurality of split displays on the mobile device. In response to determining the user is not moving the first finger in the first direction (step 206, "No" branch), the mobile device display splitting and mapping process 200 ends, since it is inferred that the user does not wish to view content in a split-screen view.

Then, at 208, the mobile device display splitting program 110A, 110B creates the plurality of split displays on the mobile device based on the movement of the first finger in the first direction. The plurality of split displays may be created using conventional techniques. For example, the display of the mobile device may be split into sections with parallel lines separating the sections, illustrated in FIG. 3. As shown in FIG. 3, the user may move the first finger in the first direction from the first location. As described above with respect to steps 202 and 206, as the user moves the first finger along the frame, the number of split displays to be created may be displayed to the user in real-time. According to at least one embodiment, the number of split displays created is directly proportional to the distance the first finger moves from the first location. For example, the greater the distance the first finger travels from the first location, the greater the number of split displays may be created. Information regarding how the specific number of split displays to be created is selected will be described in further detail below with respect to FIG. 3.

According to at least one other embodiment, after the plurality of split displays are created, the user may move the first finger in the second direction along the frame of the mobile device to remove one or more of the plurality of split displays. For example, if five split displays are created, and the user only wanted three split displays, the user may move the first finger in the second direction. As the user moves the first finger in the second direction, the number of split displays may be reduced sequentially.

Next, at 210, the mobile device display splitting program 110A, 110B identifies the contextual situation of the user. In embodiments of the present invention, the contextual situation may be an activity in which the user is engaged. For example, the user may be in the process of booking a reservation. Examples of such reservations may include, but are not limited to, a hotel reservation, an airline reservation, and/or a restaurant reservation. In another example, the user may be engaged in a different type of activity, such as listening to music and/or watching a video online. It may be appreciated that the examples described above are not intended to be limiting, and that in embodiments of the present invention the user may be engaged in a broad variety of activities.

According to at least one embodiment, the contextual situation may be identified based on applications recently opened by the user. For example, many mobile devices keep records of when users open applications, how long these applications are open, how much battery power the applications draw, as well as the data obtained by the applications. Some mobile devices even have a "recently used apps" shortcut where the user can view and open recently opened applications. In this embodiment, the contextual situation may be identified from one or more recently used apps and/or a query entered into a search engine. For example, the user may open an application associated with a mass transit agency. Such an application may have features such as departure times for trains and buses, departure tracks and gates, service advisories, and/or fare information. In this example, the user may also enter the query "How do I get to Union Station?" into the search engine. Thus, the identified contextual situation may be that the user is looking to ride on mass transit.

According to at least one other embodiment, the contextual situation may be specified by the user. For example, the user may open the same UI where the user set the configuration criteria. Continuing the example, the user may speak or type "I am looking for mass transit options" into a designated field of the UI. The contextual situation may be utilized to display the plurality of content, described in further detail below with respect to step 212.

Then, at 212, the mobile device display splitting program 110A, 110B displays the plurality of content adjacent to the second finger of the user. The plurality of content displayed is based on the contextual situation of the user. Continuing the example above where the user opens the mass transit application, the plurality of content displayed may be relevant to mass transit. For example, the displayed content may include, but is not limited to, a map application so that a user can see a location of the station and ETA to the station, a ride-share application so that the user can book a ride to the station, a mobile ticketing application to buy tickets in advance, and/or other related content. Continuing the example above where the user is booking a hotel reservation, the plurality of content displayed may be relevant to hotel bookings. For example, the displayed content may include, but is not limited to, a map application so that a user can see the location of the hotel, a ride-share application so that the user can book a ride to the hotel, paragraphs of text regarding reviews of the hotel, and/or other related content. In this manner, any content irrelevant to the current activity may not be displayed adjacent to the finger of the user.

According to at least one embodiment, the plurality of content may be displayed in aligned rows and columns along the edge of the display surface of the mobile device on the side of the second finger of the user. According to at least one other embodiment, the plurality of content may be displayed in an elliptical cluster along the edge of the display surface of the mobile device on the side of the second finger of the user. Upon displaying the plurality of content, individual items of this plurality of content may be mapped to one or more of the plurality of split displays, described in further detail below with respect to step 214.

Next, at 214, the mobile device display splitting program 110A, 110B maps the one or more items of the plurality of content to the one or more of the plurality of split displays. The mapping may be executed based on the movement of the second finger along the frame of the mobile device from the second location. As described above with respect to step 204, the second location may be a particular location of the second finger on the frame of the mobile device on an opposite side of the mobile device from the first location.

According to at least one embodiment, the user may press and hold the second finger against the frame of the mobile device at the second location. In response to the press and hold action, an initial item of content is highlighted with a colored indicator (e.g., a yellow line around the perimeter of the item of content), and if the user continues the press and hold action, the highlight indicator cycles through different items of content until the user releases the second finger from the frame of the mobile device. In this manner, the user can select an item of content so that the item can be moved to one of the plurality of split displays. In this embodiment, once an item is highlighted, the user may move the item by moving the second finger along the frame of the mobile device in either an upward or downward direction, depending on the desired split display to which the user would like to map the item.

According to at least one other embodiment, the mobile device display splitting program 110A, 110B may use gaze analytics to highlight an item of content which has been previously mapped to one of the plurality of split displays. In this manner, the user may move the item of content between the plurality of split displays. In this embodiment, the user may focus their eyes on a particular item in one of the split displays for a pre-defined period of time (e.g., five seconds). Once the pre-defined period of time is met, the particular item may be highlighted. In order to move the particular item to a different split display, the user may hover the second finger over the screen of the mobile device and, without touching the screen, make a motion in the air in either an upward or downward direction, depending on the desired split display to which the user would like to map the item. Additionally, in this embodiment, once a particular item already mapped to one of the plurality of the split displays is highlighted, the user may adjust a zoom-level of the particular item by moving the second finger along the frame of the mobile device. For example, moving the second finger along the frame in an upward direction may zoom-in on the particular item, whereas moving the second finger along the frame in a downward direction may zoom-out on the particular item.

Then, at 216, the mobile device display splitting program 110A, 110B creates the knowledge corpus of the correlation among the one or more mapped items of the plurality of content. The knowledge corpus may be created based on historical learning. For example, the mobile device display splitting program 110A, 110B may historically gather information for each contextual situation including, but not limited to, how many split displays were created, the items of content that were mapped to each split display, the zoom-level of each item that was mapped, and/or the arrangement of each item. For example, when the user is riding mass transit, the user may map a transit application to one split display, and map a ride-sharing application to the same or different split display. This arrangement may be stored in the knowledge corpus, and in the future when the contextual situation is the same, the mobile device display splitting program 110A, 110B may automatically arrange the items of content in the split displays without user input.

According to at least one embodiment, different items of content in the same application may be mapped individually to the plurality of split displays. For example, many applications have different tabs, with each tab displaying different content. Continuing the example above, the mass transit application may have a tab to display service advisories, and another tab to display a trip planner. The user may map the service advisory content to one split display, and map the trip planner to another split display. This arrangement may also be stored in the knowledge corpus.

Referring now to FIG. 3, a diagram 300 depicting a user creating split display screens and mapping content to the split display screens is shown according to at least one embodiment. In the diagram 300, the user may grip the mobile device with a single hand 302. The user may move the thumb (i.e., the second finger) in either direction 304 to map individual items of content. The user may also move the index finger (i.e., the first finger) in either direction 306, wherein in the first direction the plurality of split displays may be created, and in the second direction one or more of the pluralities of split displays may be removed. As the user moves the first finger in the first direction along the frame of the mobile device, the number of split displays to be created 308 may be presented to the user on the edge of the screen of the mobile device adjacent to the first finger of the user. In order to select the desired number of split displays to be created 308, the user may apply pressure (e.g., press and hold) to the frame at a current position 310 next to the displayed number. For example, in the diagram 300, the user applies pressure next to the number "3." Thus, the screen of the mobile device may be split into three sections. Once the plurality of split displays are created, the user may move the thumb in either direction 304 to map the individual items of content to at least one of the plurality of split displays. For example, as illustrated in the diagram 300, the user may move the thumb downward 312 to map the individual items of content. When the desired items of content are mapped, the selected content 314 may be shown in one or more of the plurality of split displays.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
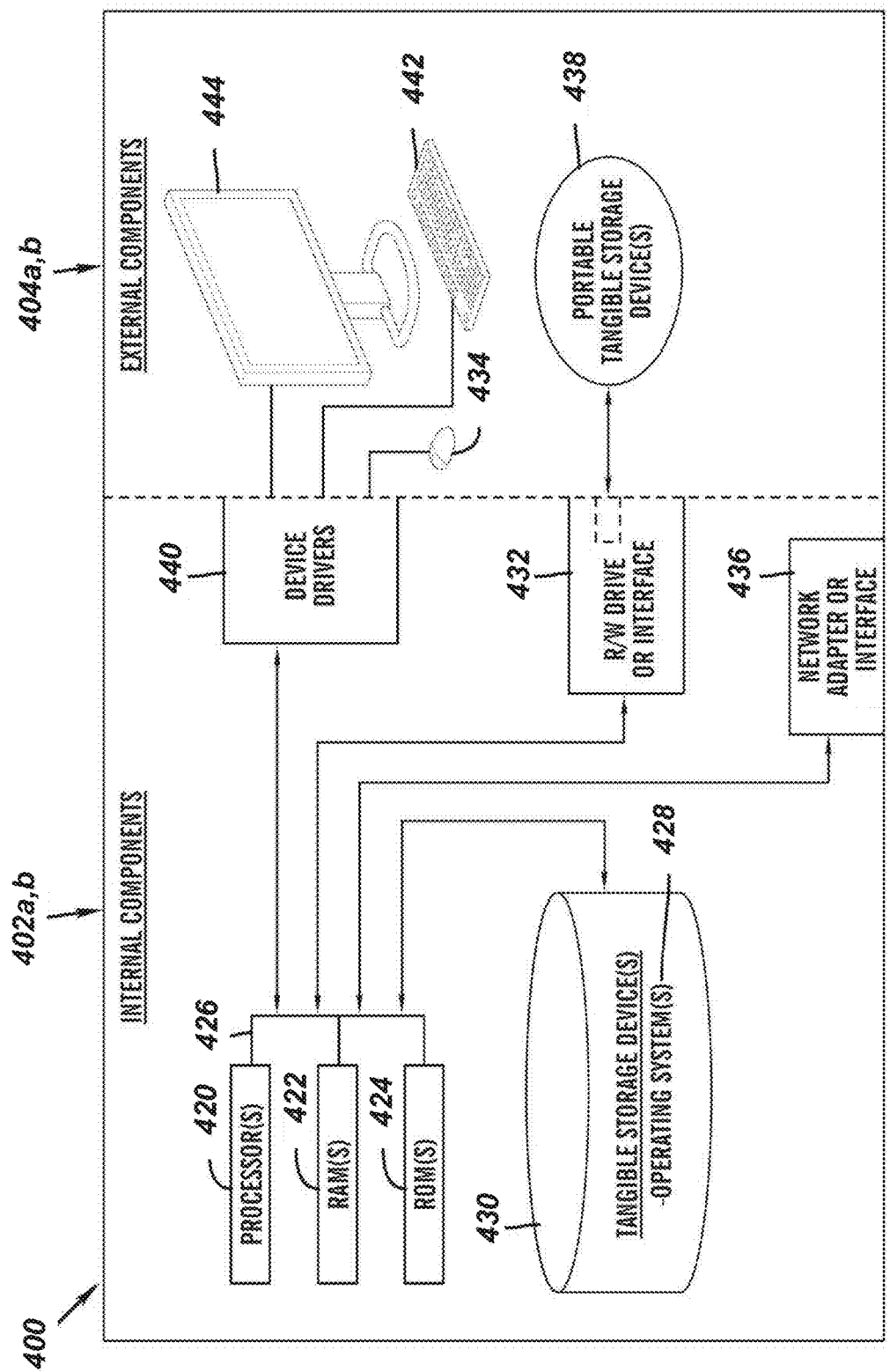
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the mobile device display splitting program 110A in the client computing device 102 and the mobile device display splitting program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the mobile device display splitting program 110A, 110B, can be stored on one or more of the respective portable computer-readable tangible storage devices 438, read via the respective RAY drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the mobile device display splitting program 110A in the client computing device 102 and the mobile device display splitting program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the mobile device display splitting program 110A in the client computing device 102 and the mobile device display splitting program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
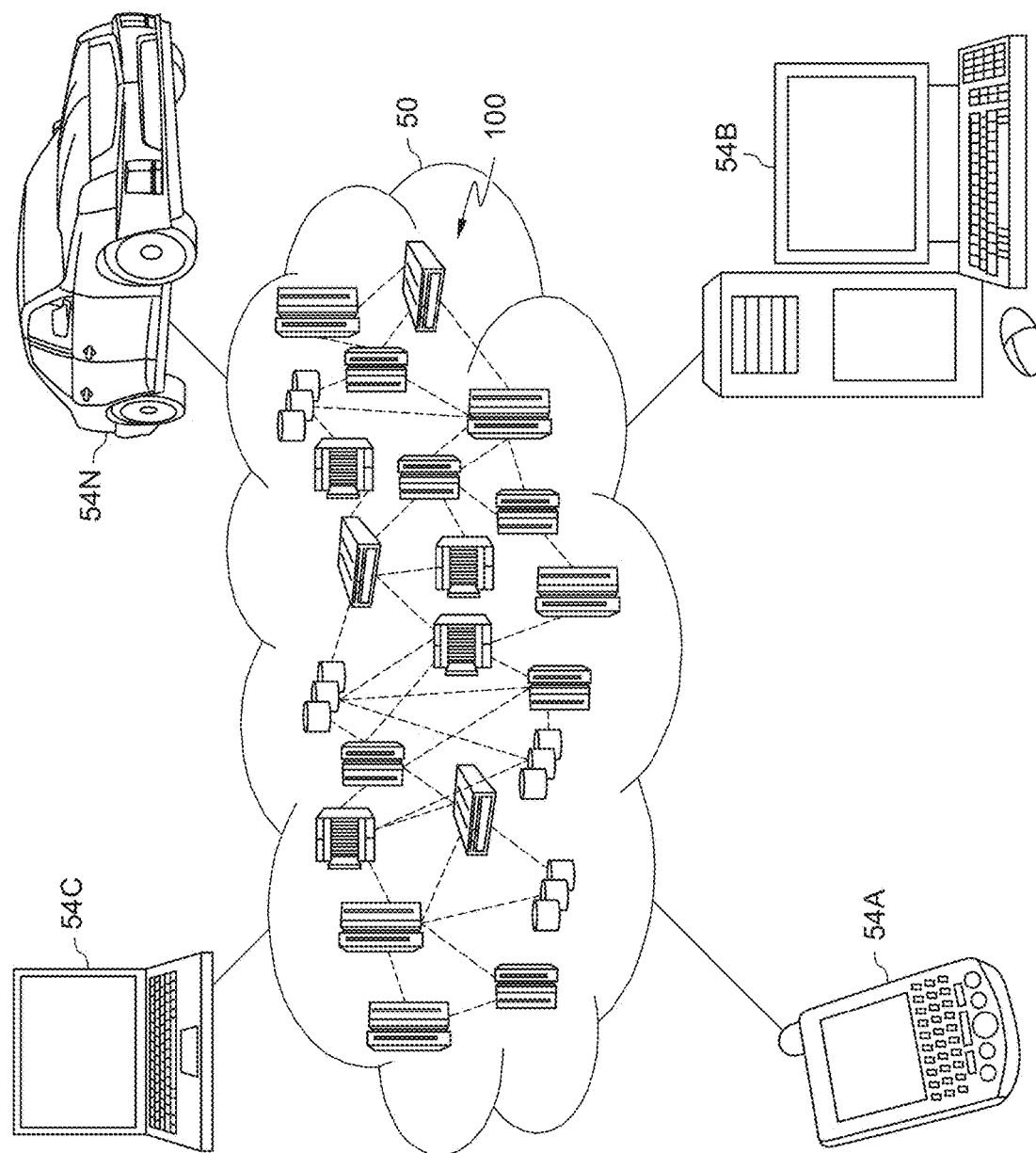
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
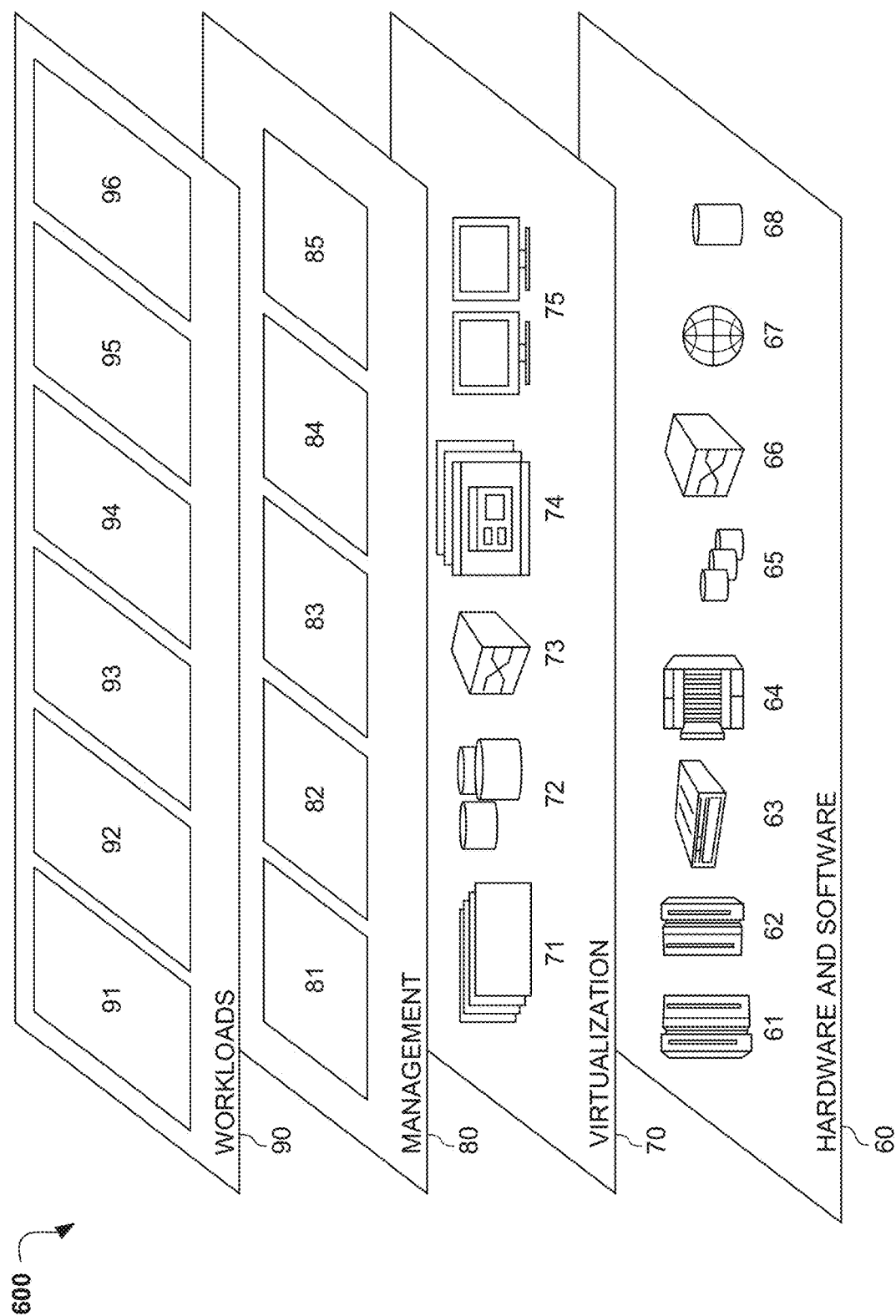
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and splitting a mobile device display and mapping content with a single hand of a user 96. Splitting a mobile device display and mapping content with a single hand of a user 96 may relate to creating a plurality of split displays on a mobile device based on movement of a first finger of the user in order to map one or more items of a plurality of content to one or more of the plurality of split displays based on movement of a second finger of the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of splitting a mobile device display, the method comprising:

receiving configuration criteria regarding mobile device display splitting and content mapping from a user;

identifying a first location of a first finger of the user on a frame of a mobile device on one side of the mobile device and a second location of a second finger of the user on the frame of the mobile device on an opposite side of the mobile device, wherein the first finger is used in the mobile device display splitting and the second finger is used in the content mapping in accordance with the configuration criteria;

determining whether the user is moving the first finger in a first direction along the frame of the mobile device from the first location on the one side of the mobile device;

in response to determining the user is moving the first finger in the first direction, creating a plurality of split displays on the mobile device based on the movement of the first finger in the first direction on the one side of the mobile device;

identifying a contextual situation of the user;

displaying a plurality of content adjacent to the second finger of the user on the opposite side of the mobile device based on the contextual situation; and mapping one or more items of the plurality of content to one or more of the plurality of split displays based on movement of the second finger along the frame of the mobile device from the second location on the opposite side of the mobile device.

2. The computer-based method of claim 1, further comprising:
creating a knowledge corpus of a correlation among the one or more mapped items of the plurality of content.

3. The computer-based method of claim 1, wherein the first finger of the user is an index finger, and the second finger of the user is a thumb.

4. The computer-based method of claim 1, wherein the user defines the first finger and the second finger in the configuration criteria.

5. The computer-based method of claim 1, wherein the first direction is a downward direction along the frame of the mobile device.

6. The computer-based method of claim 1, wherein movement of the first finger in a second direction along the frame of the mobile device from the first location removes one or more of the plurality of split displays.

7. The computer-based method of claim 5, further comprising:
displaying a number of split displays to be created on the mobile device in real-time as the user moves the first finger in the downward direction.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving configuration criteria regarding mobile device display splitting and content mapping from a user;
identifying a first location of a first finger of the user on a frame of a mobile device on one side of the mobile device and a second location of a second finger of the user on the frame of the mobile device on an opposite side of the mobile device, wherein the first finger is used in the mobile device display splitting and the second finger is used in the content mapping in accordance with the configuration criteria;
determining whether the user is moving the first finger in a first direction along the frame of the mobile device from the first location on the one side of the mobile device;
in response to determining the user is moving the first finger in the first direction, creating a plurality of split displays on the mobile device based on the movement of the first finger in the first direction on the one side of the mobile device;
identifying a contextual situation of the user;
displaying a plurality of content adjacent to the second finger of the user on the opposite side of the mobile device based on the contextual situation; and
mapping one or more items of the plurality of content to one or more of the plurality of split displays based on movement of the second finger along the frame of the mobile device from the second location on the opposite side of the mobile device.

9. The computer system of claim 8, further comprising:
creating a knowledge corpus of a correlation among the one or more mapped items of the plurality of content.

10. The computer system of claim 8, wherein the first finger of the user is an index finger, and the second finger of the user is a thumb.

11. The computer system of claim 8, wherein the user defines the first finger and the second finger in the configuration criteria.

12. The computer system of claim 8, wherein the first direction is a downward direction along the frame of the mobile device.

13. The computer system of claim 8, wherein movement of the first finger in a second direction along the frame of the mobile device from the first location removes one or more of the plurality of split displays.

14. The computer system of claim 12, further comprising:
displaying a number of split displays to be created on the mobile device in real-time as the user moves the first finger in the downward direction.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving configuration criteria regarding mobile device display splitting and content mapping from a user;
identifying a first location of a first finger of the user on a frame of a mobile device on one side of the mobile device and a second location of a second finger of the user on the frame of the mobile device on an opposite side of the mobile device, wherein the first finger is used in the mobile device display splitting and the second finger is used in the content mapping in accordance with the configuration criteria;
determining whether the user is moving the first finger in a first direction along the frame of the mobile device from the first location on the one side of the mobile device;
in response to determining the user is moving the first finger in the first direction, creating a plurality of split displays on the mobile device based on the movement of the first finger in the first direction on the one side of the mobile device;
identifying a contextual situation of the user;
displaying a plurality of content adjacent to the second finger of the user on the opposite side of the mobile device based on the contextual situation; and
mapping one or more items of the plurality of content to one or more of the plurality of split displays based on movement of the second finger along the frame of the mobile device from the second location on the opposite side of the mobile device.

16. The computer program product of claim 15, further comprising:
creating a knowledge corpus of a correlation among the one or more mapped items of the plurality of content.

17. The computer program product of claim 15, wherein the first finger of the user is an index finger, and the second finger of the user is a thumb.

18. The computer program product of claim 15, wherein the user defines the first finger and the second finger in the configuration criteria.

19. The computer program product of claim 15, wherein the first direction is a downward direction along the frame of the mobile device.

20. The computer program product of claim 15, wherein movement of the first finger in a second direction along the frame of the mobile device from the first location removes one or more of the plurality of split displays.

* * * * *